March 19, 1968  JAMES E. WEBB  3,374,339
ADMINISTRATOR OF THE NATIONAL AERONAUTICS
AND SPACE ADMINISTRATION
COUNTER AND SHIFT-REGISTER Filed Dec. 17, 1964  4 Sheets-Sheet 1

INVENTOR
CHRISTIAN SMITH
BY
ATTORNEYS

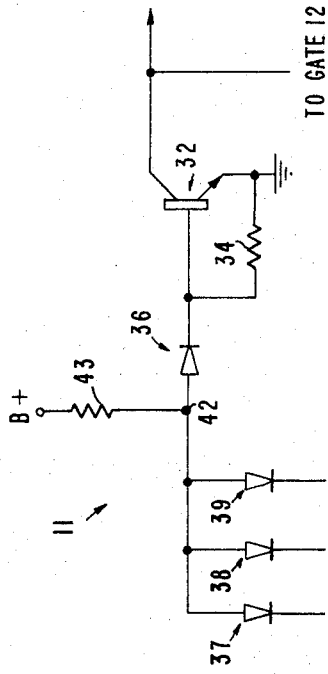
FIG. 2(b)
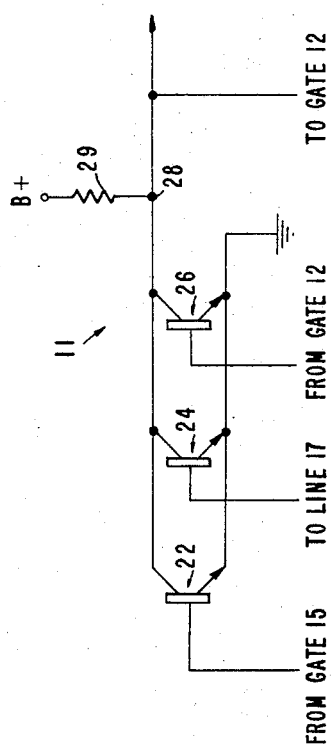
FIG. 2(a)
FIG. 6
INVENTOR
CHRISTIAN SMITH

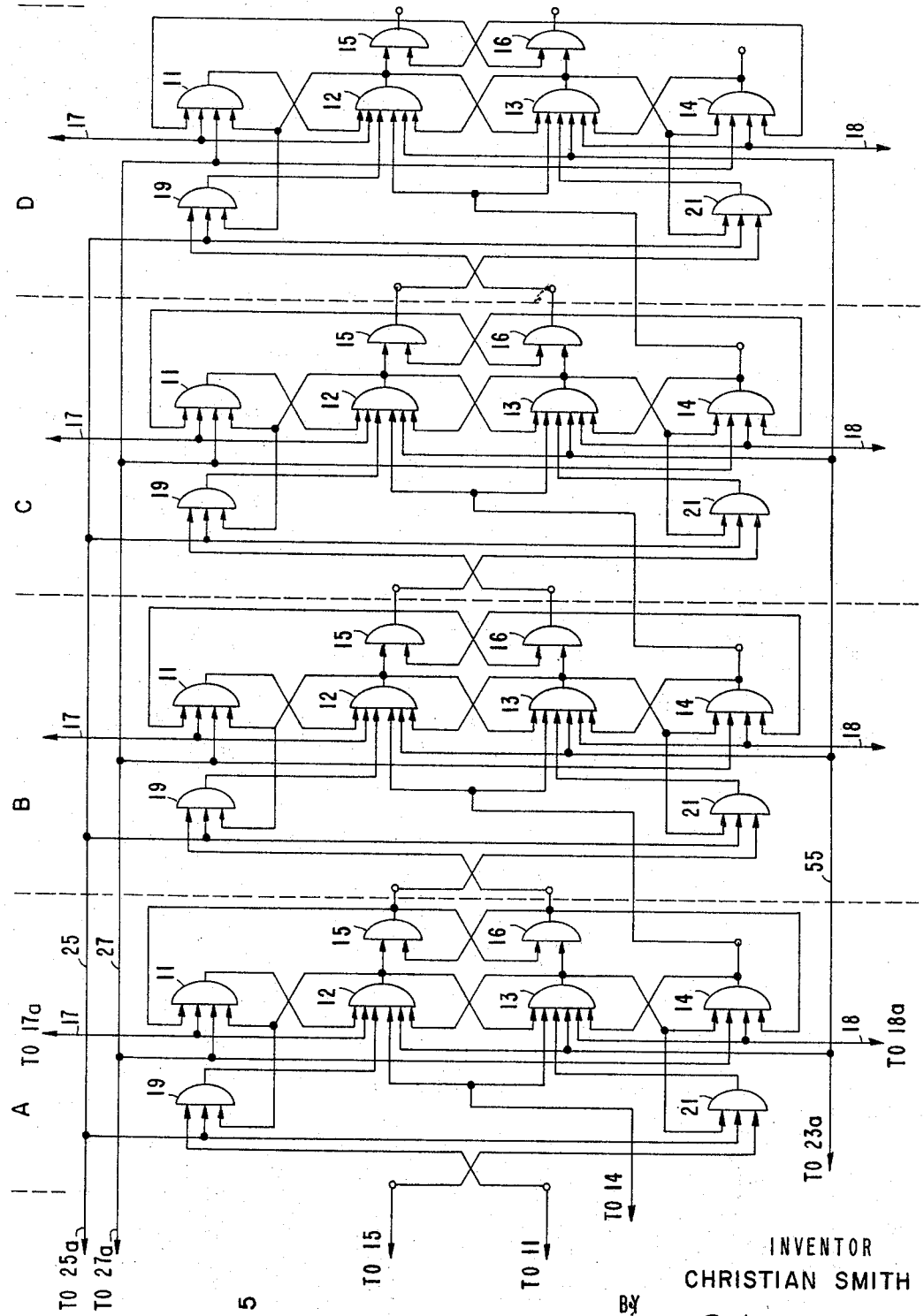

United States Patent Office 3,374,339
Patented Mar. 19, 1968

3,374,339
COUNTER AND SHIFT-REGISTER
James E. Webb, Administrator of the National Aeronautics and Space Administration, with respect to an invention of Christian Smith, Salisbury, Southern Rhodesia
Filed Dec. 17, 1964, Ser. No. 423,412
11 Claims. (Cl. 235—92)

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates to computer logic circuitry and more particularly to an improved circuit for performing both counting and shifting logic operations.

In designing circuits for modern computers, a premium is placed on the reduction of the number of components which are necessary to perform the various computers logic operation. Therefore, the trend has been to use, wherever possible, the same components and circuits to perform more than one basic operation. Also, with the development of integrated circuitry and the desire to miniaturize circuits and components as much as possible, a need exists for circuits which, besides being operable to perform more than one logic function, lend themselves to microminiaturization construction techniques.

At present, circuits which perform the logic functions both of counting and information shifting are well known in the art. These circuits generally include a plurality of elements including capacitors which are used in the performance of the counting operation, and in particular in shifting the information. The inherent rise-time of capacitors limits the response characteristics of such circuits to triggering signals, as well as increases the sensitivity of the circuits to extraneous noise and undesired signal pickup. However, the basic disadvantage of using capacitors in such counter/shifting circuits is that the circuits cannot be easily miniaturized since the capacitors generally occupy a significant amount of space.

In the present state-of-the-art, it is difficult to fabricate solid-state miniature capacitors with close tolerances which can be easily incorporated in microminiaturized circuitry. Also, solid-state capacitors are generally temperature-sensitive as well as subject to degradation due to aging effects. Therefore, the need exists for a counter/shifting circuit which includes only non-capacitive elements adaptable to miniaturization construction techniques.

Accordingly, it is an object of the present invention to provide a novel counter/shifting circuit which is adaptable to microminiaturization.

Another object of the invention is to provide a counter/shifting circuit in which a simple logic gating circuit is used as the basic circuit element.

Yet another object of the invention is the provision of a circuit in which only solid-state noncapacitive components are incorporated in a plurality of Nand gates to perform the necessary counting and shifting operations.

A further object of the invention is the provision of a counter/shifting circuit in which only noncapacitive solid-state components are arranged in a plurality of Nand gates, the entire circuit being adaptable to be miniaturized or integrated in a basic integrated circuit.

These and other objects are achieved by providing a circuit in which only noncapacitive solid-state elements are used in a simple matrix layout of Nand gates. All the elements used are of the type which are at present available in miniature sizes. The elements are directly inter-coupled so that capacitors are not needed to perform either of the two desired operations. The simplicity of the matrix layout adapts the circuit to micromodular integrated circuitry construction techniques. Thus, the size of the circuit may be greatly reduced. Since all basic components are noncapacitive solid-state elements, they can all be integrated in a simple semiconductive chip or element, further reducing the size of the circuit as well as the cost of manufacturing.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a circuit diagram of a portion of the invention used in a counting mode;

FIGURES 2(a) and 2(b) are schematic diagrams of non-capacitive solid-state Nand gates;

FIGURE 5 is a circuit diagram of an arrangement incorporating four stages of the present invention; and FIGURE 6 is a chart useful in explaining the operation of the arrangement shown in FIGURE 5.

Figure 1:
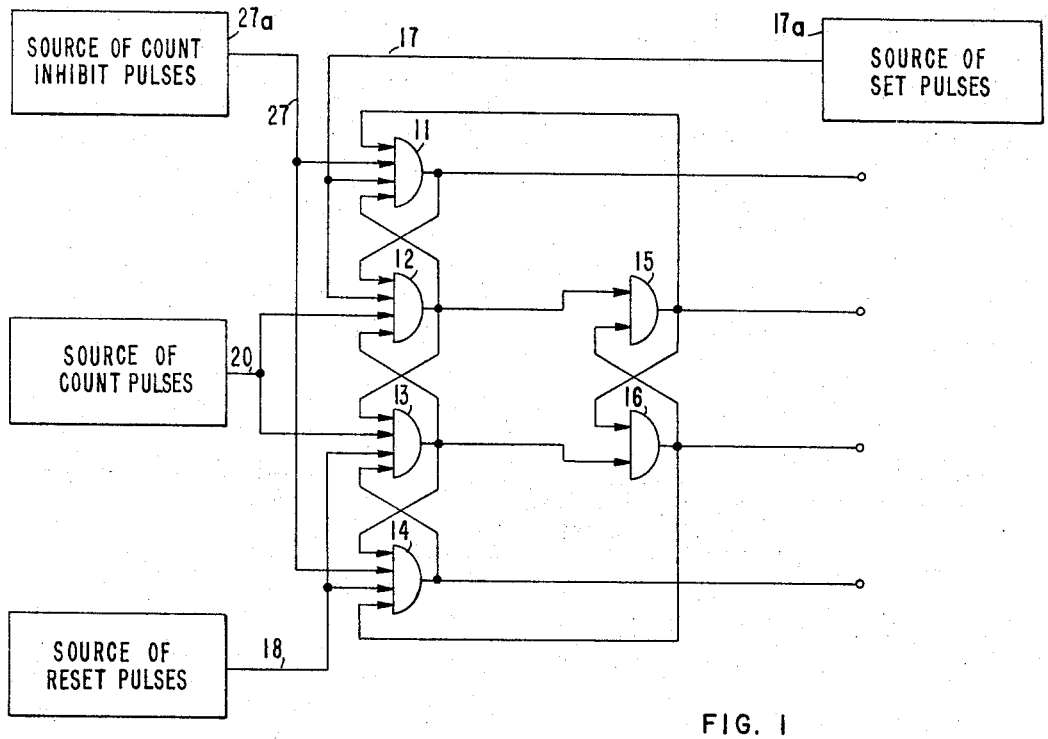

Reference is now made to FIGURE 1 which is a circuit diagram useful in explaining the part of the novel circuit of the invention which is used in the counting operation. As seen therefrom, the circuit comprises gates 11–16, each having an output terminal or line and two or more input terminals or lines. Three input lines of gate 11 are connected to output lines of gates 12 and 15 and to a source of set pulses 17a through a "set" line 17, respectively. Similarly, the three input lines of gate 14 are connected to output lines of gates 13 and 16 and to a source of reset pulses 18a through a "reset" line 18. Each of gates 12 and 13 have four input lines. Those of gate 12 are connected to the output lines of gates 11 and 13, and to the line 17 as well as a shift input line 19. One input line of gate 13 is also connected to line 19 while the other three lines are connected to reset line 18 and to output lines of gates 12 and 14 respectively. Single input lines of gates 15 and 16 are connected to output lines of gates 12 and 13 respectively, while the other input of each gate (15 and 16) is connected to the output line of the opposite gate.

Each of the gates shown in FIGURE 1 is a solid-state non-capacitive Nand gate which may be thought of as a circuit in which a signal of a given polarity on any one of the input lines will cause the gate to produce an output signal of an opposite polarity. Two examples of solid-state non-capacitive gates which produce such signals are shown in FIGURES 2(a) and 2(b) to which reference is made herein. As seen in FIGURE 2(a), a gate such as gate 11 having three input lines may comprise of three transistors 22, 24 and 26, the collectors of the transistors being connected together at a junction point 28 which serves as the output terminal of the gate 11. Point 28 is also used to connect the three collectors to a source of positive potential B+ (not shown) through a resistor 29. The base of each of the transistors serves as an input terminal, connecting the gate to one of its input lines. Each of the transistors is also connected to ground potential through its respective emitter.

From FIGURE 2(a), it is clear to one familiar with the art that the potential level at the output terminal 28 is high, namely close to B+ as long as all the transistors 22, 24 and 26 are in their nonconducting states, which is the case so long as their respective bases are at a low potential level, such as ground. However, as soon as an input signal having a potential level close to B+ is supplied to any of the bases, the respective transistor is switched to a conducting state, thereby lowering the potential level at point 28 from B+ to substantially ground potential.

It is thus seen that the gate shown in FIGURE 2(a) produces an output signal which is represented by a drop in the potential at point 28 in response to any input signal which is represented by an increase in potential level. The basic gate of the present invention may be constructed to include a single transistor with a plurality of diodes such as shown in FIGURE 2(b).

As seen therefrom, the gate 11 comprises a transistor 32 having its collector serve as the output terminal and its emitter connected to ground potential. A resistor 34 interconnects the emitter to the base which is connected to the cathode of a diode 36. The anode of diode 36 as well as anodes of diodes 37, 38 and 39 are all joined together at a point 42 which is connected to B+ through a resistor 43. The cathodes of diodes 37, 38 and 39 serve as the input terminals of the gate 11. As long as the cathodes of diodes 37, 38 and 39 are maintained at a potential substantially equal to B+, current will not flow therethrough. Consequently, point 42 will be at about B+ potential thereby maintaining transistor 32 in a conducting state or a low potential level at the collector. However, as soon as any one of the cathodes of diodes 37, 38 and 39 is at a low potential level, the level at point 42 will be reduced to cut-off the transistor 39 and thereby raise the potential of its collector which serves as the output terminal.

From the foregoing, it is thus seen that either of the gates shown in FIGURES 2(a) and 2(b) provides an output signal of a known polarity in response to an input signal of an opposite polarity which is applied to any of the gate's input lines. For explanatory purposes, hereinafter it will be assumed that as long as all of the input lines are supplied with negative signals, namely, the inputs are "false," the gate will provide a positive signal, or a "true" output. However, any true input will cause the gate to produce a false output.

Figure 3:
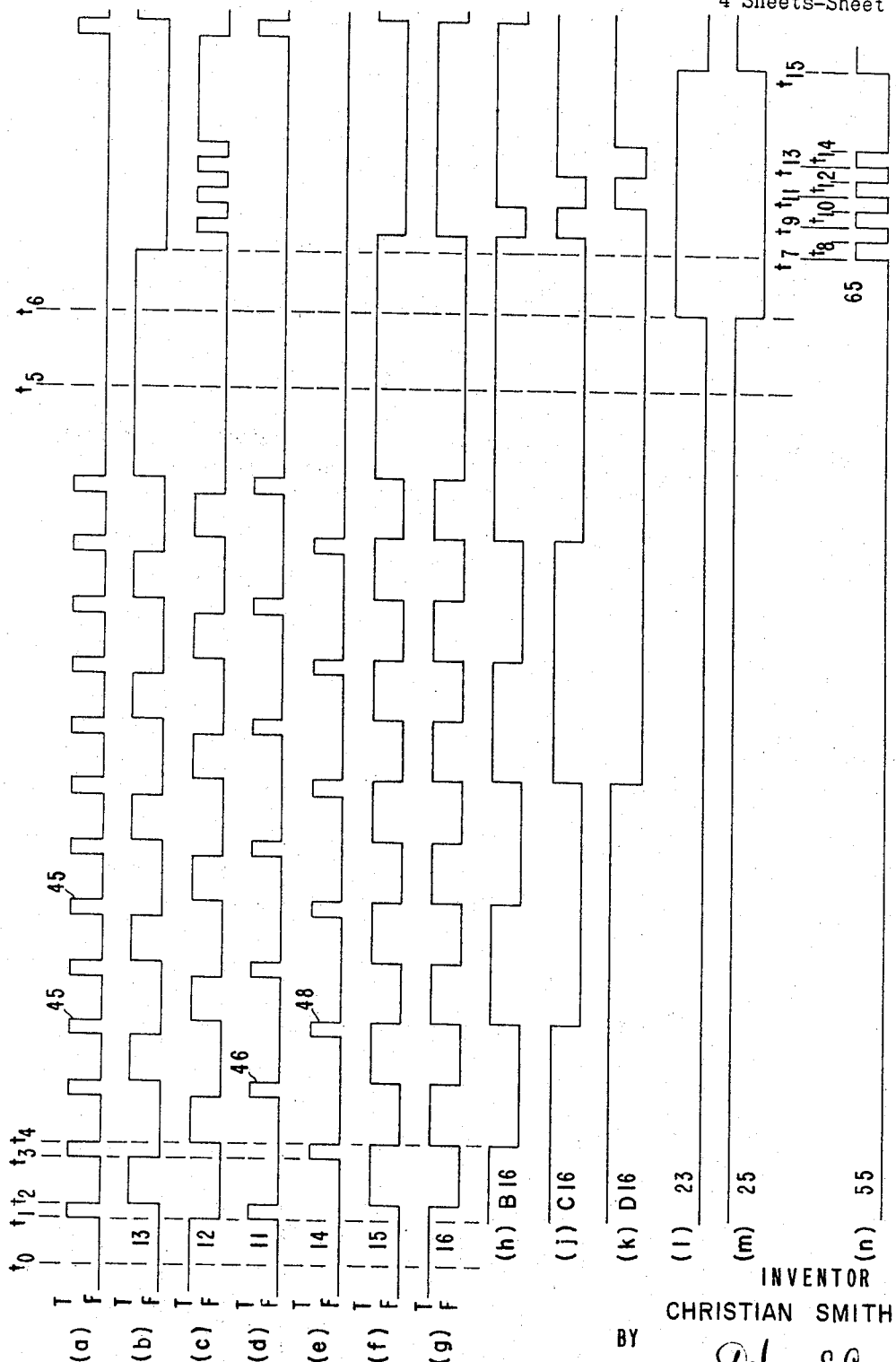
FIGURE 3 is a diagram of waveforms useful in explaining the operation of the novel circuit of the invention.

Reference is now made to FIGURE 3 which is a diagram of waveforms useful in explaining the operation of the present invention. Line $a$ represents the waveform of a plurality of input count pulses 45 supplied to gates 12 and 13 (FIGURE 1) through input line 20. The count pulses may be supplied to gates 12 and 13 from a gate similar to gate 14 or 11 of a previous circuit as shown in FIGURE 1. Similarly, the count pulses may be supplied from a source of count pulses 20a. Lines $b$ through $g$ (FIGURE 3) represent the waveforms of the outputs of gates 13, 12, 11, 14, 15 and 16 respectively. As shown in FIGURE 3, let us assume that at a time $t_0$, the circuit of FIGURE 1 is set by means of a pulse supplied via line 17 to gates 11 and 12 so that thereafter, the output levels of gates 11–16 are as shown. Namely, gates 12 and 16 are true and all the others are false.

The first of count pulses 45 is supplied at time $t_1$. As a result, both gates 12 and 13 are supplied with a true input. Gate 13 is unaffected since it is already false. But gate 12, which is true prior to $t_1$, is switched to a false state by the true input pulse. The false output from gate 12 is supplied to gate 11 which now has all its inputs false so that it switches to a true state. At time $t_2$, the count pulse 45 terminates so that gate 13 is no longer supplied with a true input. Consequently, gate 13 becomes true which in turn causes gates 12, 14 and 16 to either remain or be switched to the false state. With both gates 12 and 16 being false, gate 15 is switched to true which in turn switches gate 11 to false.

These states will continue until time $t_3$ when the second count pulse starts. As a result, gate 13 will be switched to false. With gates 13 and 16 being false, gate 14 is switched to a true state. At time $t_4$, the second count pulse 45 terminates, thus there are no longer any true inputs to gate 12 to maintain it in a false state. Consequently, gate 12 switches to true which in turn causes gate 15 to switch to false. With both gates 15 and 13 being false, gate 16 becomes true which in turn causes gate 14 to be switched to the false state.

After $t_4$ and before $t_5$ when the next count pulse is initiated, the levels of the gates 11–16 are the same as at time $t_0$, so that additional pulses will cause the circuit to merely repeat the sequence of operation hereinbefore described. It is thus seen that for every two input counter pulses, gates 11 and 14 produce single pulses designated in FIGURE 3 by numerals 46 and 48 respectively. Thus, the circuit of FIGURE 1 may be thought of as a binary divider or counter producing a single pulse for every two pulses. By connecting the output of gate 14 to the inputs of gates of a succeeding stage, similar to gates 12 and 13 of the circuit shown in FIGURE 1, an arrangement comprising a plurality of stages is created. Each stage in a sense divides by two the number of pulses supplied from the previous stage, thus the entire arrangement performs as a binary counter.

Figure 4:
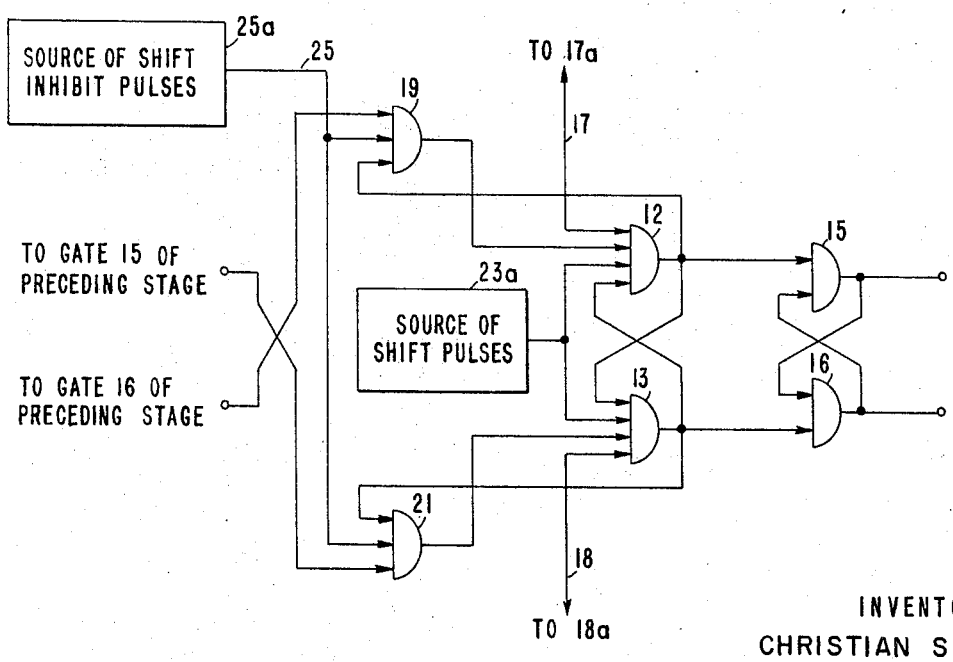
FIGURE 4 is a circuit diagram of a portion of the invention used in an information shifting mode.

As previously stated, the novel circuit of the invention, in addition to performing a counting operation, also operates in an information shifting mode. In such a mode, gates 11 and 14 (FIGURE 1) of each stage are inhibited, and only gates 12, 13, 15 and 16, together with two additional Nand gates are used. Reference is now made to FIGURE 4 which is a simplified circuit diagram useful in explaining the shifting operation of the novel circuit of the present invention. As seen therein, gates 15 and 16 are interconnected in a manner similar to that shown in FIGURE 1. Similarly, gates 12 and 13 are interconnected to one another as well as to gates 15 and 16. However, in addition, the output of gate 12 is connected to one of the inputs of a Nand gate 19, another input of Nand gate 19 being connected to a gate similar to gate 16 of a preceding stage. The output of gate 19 is connected as one input of gate 12.

Similarly, the output of gate 13 is connected as one input to a Nand gate 21, having another input connected to a Nand gate, similar to gate 15, of a preceding stage. The output of gate 21 is connected as one input to gate 13. Also, gates 12 and 13 are connected to a junction point 23 through which shift pulses are supplied to both gates from a source of shift pulses 23a, in a manner similar to the count pulses supplied to the two gates as hereinbefore described.

When operating in the information shifting mode, one or more true shift pulses are simultaneously supplied to gates 12 and 13 of each of the stages of the circuitry of the present invention. These true shift pulses cause gates 12 and 13 to produce false output pulses for the duration of the true shift pulses supplied thereto. Thereafter, namely between true shift pulses, the gates 12 and 13 of each stage adapt a true or a false state, depending on the outputs of the gates interconnected with them. For example, gates 12 and 13 shown in FIGURE 4 produce false outputs during the duration of a true shift pulse supplied to both gates via the junction point 23. However, after the true shift pulse terminates, the gate 12 will provide either a true or a false output, depending on the input supplied thereto from the gate 19, which is in turn also controlled by the output of a gate similar to gate 16 from a previous stage. Similarly, the state of gate 13, after the termination of the true shift pulse, will depend on the output from gate 21 as well as the state of gate 12.

In order to insure the proper operation of the circuit of the present invention, gates 11 and 14 are inhibited from counting during the shift operation, and gates 19 and 21 are inhibited from shifting information during the counting operation. As seen from FIGURE 1, gates 11 and 14 are so inhibited by being connected to a source of count inhibit pulses 27a through a count inhibit line 27 which provides the two gates with a true input pulse during the shifting operation, thus setting both gates 11 and 14 to a false state. Similarly, gates 19 and 21 (see FIGURE 4) are connected to a source of shift inhibit pulses 25a through a shift inhibit line 25 which supplies both gates with true input pulses during the counting operation so as to set both gates 19 and 21 to a false state during the operation in which gates 19 and 21 do not participate.

For a better understanding of the novel circuit of the present invention, as well as the novel operational characteristics thereof, reference is now made to FIGURE 5 which is a circuit diagram of an arrangement including four stages designated A, B, C, and D. Each stage comprises the novel counting and shifting circuit of the present invention employing only non-capacitive solid-state Nand gates. As seen from FIGURE 5, the count inhibit lines 27 and shift inhibit lines 25 of all the four stages are interconnected, while the set line 17 and reset line 18 are not connected together so that each stage may be set or reset individually. Hereinafter, each gate will be designated by the letter designation of the stage of which it is a part, as well as its particular numeral. Thus, gate 11 of stage A, hereinafter, will be represented by A11.

Reference is again made to FIGURE 3, wherein lines $h$, $j$ and $k$ represent the levels of the output of gates B16, C16 and D16 respectively. Lines $l$, $m$ and $n$ of FIGURE 3 represent the levels of the count inhibit line 23, the shift inhibit line 25 and the shift pulse line 55 respectively.

Let us assume that from time $t_0$ (FIGURE 3) to a time $t_6$, the arrangement of FIGURE 5 is operated in the counting mode, with 15 count pulses designated by numeral 45 being supplied to stage A. The output levels of gates A11 through A16 are shown on lines $b$ through $g$ of FIGURE 3, with lines $h$, $j$, and $k$ representing the output levels of gates B16, C16 and D16 respectively. The output levels of all the gates are indicated by plus (+) or minus (−) signs in a chart shown in FIGURE 6 to which reference is made herein. Each column of the chart represents a different gate and each row represents a different time period. The plus sign indicates that a particular gate is true, namely, produces a positive output level whereas a negative sign indicates that the gate is false.

Prior to time $t_6$, such as at time $t_5$, the gates of stages A through D have output levels as shown on the first line of FIGURE 6. Thereafter, at time $t_6$, gates 11 and 14 of each stage are inhibited and gates 19 and 21 of each stage are enabled by the respective positive and negative pulses or levels on the count inhibit line and shift inhibit line shown on lines $l$ and $m$ of FIGURE 3. As a result, gates 11 and 14 of the stages have false outputs and gates 19 and 21 adapt output levels, depending on the levels of the gates associated with them. As seen from the line $t_6$ of FIGURE 6, only gate D19 changes from false to true. This becomes apparent since after $t_6$, the two inputs to D19 from D12 and C16 are both false, thus D19 becomes true. Gates 11 and 14 of all the stages remain inhibited until a time $t_{15}$ when the arrangement is again switched to a count mode, as will be explained hereinafter. At time $t_7$, the first shift pulse of a group of shift pulses 65 is supplied from the source of shift pulses 23a via shift pulse line 55 (see line $n$ of FIGURE 3) to gates 12 and 13 of each stage. Thus, gates 12 and 13 provide false outputs which in turn cause the rest of the gates to adapt the output levels as shown on the third line of FIGURE 6.

At time $t_8$, the first pulse 65 terminates, thus no longer supplying true inputs to gates 12 and 13. Consequently, gates 12 and 13 are free to be set in either a true or a false state, depending on the states of the gates which supply their input signals. Depending on the states to which gates 12 and 13 are set, gates 15 and 16 are directly affected. At times $t_9$, $t_{11}$ and $t_{13}$, second, third and fourth shift pulses are supplied. These pulses terminate at time $t_{10}$, $t_{12}$ and $t_{14}$ respectively. During the presence of these pulses, gates 12 and 13 are false. But, between the shift pulses, the gates may be either true or false, depending on the inputs supplied thereto. As seen from FIGURE 6, lines marked $t_8$ through $t_{14}$ represent the outputs of the various stages during the period between $t_8$ and $t_{14}$. Also, the changes in the output levels of B16, C16 and D16 as well as gates A13, A12, A15 and A16 are shown in FIGURE 3.

At time $t_{15}$, the levels on count inhibit line 23 and shift inhibit line 25 will be switched, thus, terminating the shifting operation by inhibiting gates 19 and 21 of each stage as indicated by the minus signs on the last line of FIGURE 6 in the columns of gates 19 and 21 and initiating a new counting mode. At the same time, gates 11 and 14 will no longer be inhibited so that when a subsequent count pulse such as pulse 69 shown on line $a$ of FIGURE 3 is supplied, the arrangement of FIGURE 6 will again operate in the counting mode.

From the foregoing description, it is seen that the present invention provides a novel circuit which may be arranged in a plurality of stages to perform counting as well as information shifting operations. Each stage comprises eight solid-state non-capacitive Nand gates, four gates of each stage are used for both counting and shifting purposes, while of the other four gates, two are used in the counting operation and the other two are used for the shifting operation.

The circuit is most versatile in that data may be read in and out of the various stages in parallel. Also single phase shift pulses supplied in parallel to all the stages may be employed. In the shift mode, each stage samples the state of the previous stage with the leading edge of each shift pulse and reads in such shifted data with the trailing edge of a shift pulse. For example, B16 of stage B reads in the state of stage A during the trailing edge of the first shift pulse at time $t_8$ (FIGURE 3). In addition, each stage may be conveniently set and reset by causing particular gates to be set to the false or true states.

Each stage is completely symmetrical so that complement input signals may be used. The gates are all of the Nand type incorporating only non-capacitive solid-state components which are directly coupled to one another thus providing great simplicity of layout and interconnection. This characteristic particularly adapts the novel circuit of the invention to modern mircomodular integrated circuit construction techniques.

It is apparent to those familiar with the art that modifications may be made in the arrangement as shown without departing from the true spirit of the invention. Therefore, all such modifications and equivalents are deemed to fall within the scope of the invention as claimed in the appended claims.

What is claimed is:

1. A counting and shifting circuit comprising: a plurality of gating means, each gating means having an output terminal a plurality of input terminals and being characterized by providing an output of a first polarity on said output terminal whenever none of said input terminals is provided with an input signal of said first polarity, each of said gating means being characterized by providing an output signal of a second polarity whenever an input signal of said first polarity is provided to any one of the input terminals thereof; means for interconnecting said first plurality of gating means; count inhibiting means for inhibiting at least some of said gating means whenever said plurality of gating means is operable in a shifting mode; means for energizing some of said gating means with a plurality of shift pulses so as to control the outputs of said plurality of gating means; shift inhibiting means for inhibiting at least some of said gating means whenever said circuit is operable in a counting mode; and means for energizing some of said gating means with counting pulses to provide output pulses as a function of the number of said counting pulses supplied thereto.

2. A circuit for counting count pulses supplied thereto and for shifting data in response to shift pulses comprising: first, second and third pluralities of gating means each gating means having an output terminal a plurality of input terminals and being characterized by providing an output of a first polarity on said output terminal whenever none of said input terminals is provided with an input signal of said first polarity, each of said gating means being characterized by providing an output signal of a second polarity whenever an input signal of said first polarity is provided to any one of the input terminals thereof; means for interconnecting said first, second and third pluralities of gating means; shift inhibiting means for inhibiting the gating means of said second plurality of gating means from providing output signals of said first polarity; means for supplying said count pulses to some of said first plurality of gating means to energize said first and third pluralities of gating means to count said count pulses; count inhibiting means for inhibiting the gating means of said third plurality of gating means from providing output signals of said first polarity; and means for supplying to said shift pulses to said some of said first plurality of gating means to energize said second means and said first means to shift the output signals thereof as a function of said shift pulses supplied thereto.

3. A circuit for providing count output signals in response to count pulses and for shifting information represented by the levels therein in response to shift signals supplied thereto comprising: first, second, third, fourth, fifth, sixth, seventh and eighth gating means each gating means having an output terminal a plurality of input terminals and being characterized by providing an output of a first polarity on said output terminal whenever none of said input terminals is provided with an input signal of said first polarity, each of said gating means being characterized by providing an output signal of a second polarity whenever an input signal of said first polarity is provided to any one of the input terminals thereof; means for interconnecting said gating means; shift inhibiting means for selectively inhibiting said fifth and sixth gating means from providing output signals of said first polarity; means for supplying said count pulses to said first and second gating means to control the polarities of the output signals of said interconnected first, second, third, fourth, seventh and eighth gating means to provide count output signals from the output terminal of said eighth means as a function of the number of count pulses supplied to said first and second gating means; count inhibiting means for selectively inhibiting said seventh and eighth gating means from providing output signal of said first polarity; and means for supplying said shift pulses to said first and second gating means to control the shifting of said information as a function of the output signals of said third and fourth interconnected gating means.

4. A circuit as recited in claim 3 wherein the input terminals of said first gating means are connected to at least the output terminals of said second, fifth and seventh gating means and to said means for supplying said count pulses, wherein the input terminals of said second gating means are connected to at least the output terminals of said first, sixth and eighth gating means and said means for supplying said count pulses, the input terminals of said third gating means being connected to the output terminals of said first and fourth gating means, the input terminals of said fourth gating means being connected to the output terminals of said second and third gating means, the input terminals of said fifth means being connected at least the output terminal of said first gating means and to said shift inhibiting means, one input terminal of said sixth gating means being also connected to said shift inhibiting means at least another terminal of said sixth gating means being connected to the output terminal of said second means, the input terminals of said seventh means being connected to at least the output terminals of said first and third gating means, the input terminals of said eighth gating means being connected to at least the output terminals of said second and fourth gating means and wherein said count inhibiting means is connected to input terminal of said seventh and eighth gates.

5. A circuit as recited in claim 4 wherein each of said gating means comprises non-capacitive solid-state means.

6. A circuit as recited in claim 5 wherein said circuit further includes setting means connected to at least the input terminals of said first and seventh gating means and resetting means connected to at least the input terminals of said second and eighth gating means for selectively setting and resetting said gating means so as to control the output signals thereof.

7. In a counting stage comprising of a plurality of interconnected Nand gates each having a single output and a plurality of inputs wherein the output of a first Nand gate is connected to the inputs of second, third and fourth Nand gates, the output of said second Nand gate being connected to the inputs of said first Nand as well as fifth and sixth Nand gates, the output of said third Nand gate being connected to the inputs of said fourth and fifth Nand gates, the outputs of said fourth and sixth Nand gates being respectively connected to the inputs of said first and second Nand gates and the output of said fifth Nand gate being connected the inputs of said third and sixth Nand gates so as to provide a count output signal from the output of at least said sixth Nand gate in response to count pulses supplied to said first and second Nand gates the arrangement for energizing said first, second, third and fourth Nand gates so as to shift data therethrough comprising: seventh and eighth Nand gates each having an output and a plurality of inputs; means for connecting the outputs of said first, second, seventh and eighth Nand gates to inputs of said seventh, eighth, first and second Nand gates respectively; shift pulse means for providing shift pulses; means for connecting said shift pulse means to inputs of said first and second Nand gates so as to provide said shift pulses thereto to shift data therethrough; count inhibit means for providing count inhibit pulses; means for connecting said count inhibit means to inputs of said fourth and sixth Nand gates so as to selectively inhibit said gates from providing an output of a predetermined polarity whenever said first, second, third, fourth, seventh and eighth Nand gates are operable to shift data therethrough; count pulse means for providing count pulses; means for connecting said first and second Nand gates to provide said count pulses thereto to control the outputs of said first, second, third, fourth, fifth and sixth Nand gates so as to provide count output signals as a function of the number of count pulses supplied to said first and second Nand gates; shift inhibit means for providing shift inhibit pulses; and means for connecting said shift inhibit means to inputs of said seventh and eighth Nand gates so as to selectively inhibit said gates from providing an output of a predetermined polarity whenever said seventh and eighth Nand gates are not operable to shift data therethrough.

8. In a counting stage as recited in claim 6 wherein said first, second, third, fourth, fifth, sixth, seventh and eighth Nand gates comprise non-capacitive solid-state elements with the output of the gates being directly connected to the appropriate inputs of the corresponding gates.

9. In a counting stage comprising a plurality of interconnected Nand gates wherein count pulses are supplied to some of said Nand gates to control the outputs of said plurality of interconnected Nand gates and provide count outputs from at least a single Nand gate as a function of the number of count pulses supplied to said some of said Nand gates, the arrangement for energizing a group within said plurality of interconnected Nand gates to shift data therethrough as a function of the change of outputs thereof comprising: Nand gating means having outputs and inputs; means for connecing the ouputs and inputs of said Nand gating means to the respective inputs and outputs of said some of said Nand gates to which said count pulses are supplied and for connecting the outputs; count inhibit means; means for connecting said count inhibit means to some of said first plurality of Nand gates so as to inhibit said Nand gates from providing outputs of a predetermined polarity; shift inhibit means; and means for connecting said shift inhibit means to said Nand gating means so as to inhibit said Nand gating means from providing outputs of a predetermined polarity whenever said stage is operable to count said count pulses supplied thereto.

10. A system for counting count pulses and for shifting data stored therein in response to shift pulses supplied thereto comprising: a plurality of stages each stage comprising first, second and third pluralities of gating means; means for interconnecting said first, second and third pluralities of gating means of each stage; means for interconnecting the first and second pluralities of gating means of each stage with the third and first pluralities of gating means of the preceding stage thereof; shift inhibiting means for inhibiting the second plurality of gating means of each stage from providing output signals of a predetermined polarity; count pulse means for providing count pulses; means for supplying said count pulses to some of the gating means of said first plurality of gating means of the first stage of said plurality of stages for counting said count pulses therein so as to provide count output signals from said system as a function of the number of count pulses supplied thereto and the number of stages in said plurality of stages; count inhibiting means; means for connecting said count inhibiting means to the gating means of each of said stages so as to inhibit said gating means from providing output signals of said predetermined polarity; and means for supplying shift pulses to said some of the gating means of said first polarity of gating means of each of said stages so as to shift the data stored therein as a function of the change in output signals of the gating means in said first and second pluralities of gating means of each of said plurality of stages.

11. A system as recited in claim 9 wherein each of said gating means comprises a non-capacitive solid-state Nand gate, said system further including set and reset means connected to at least some of the gating means of at least said first and third pluralities of gating means of each stage for setting and resetting the outputs of at least said gating means to predetermined polarities.

References Cited

UNITED STATES PATENTS 3,146,345 8/1964 Conover ........... 328—37 X
3,258,696 6/1966 Heymann ........... 328—37

MAYNARD R. WILBUR, *Primary Examiner.*

G. J. MAIER, *Assistant Examiner.*